(No Model.)

P. BURNS.
NUT LOCK.

No. 575,695. Patented Jan. 26, 1897.

Witnesses

Inventor
Philip Burns.
By Attorney
Frank H. Allen

UNITED STATES PATENT OFFICE.

PHILIP BURNS, OF NORWICH, CONNECTICUT.

NUT-LOCK.

SPECIFICATION forming part of Letters Patent No. 575,695, dated January 26, 1897.

Application filed May 25, 1896. Serial No. 593,050. (No model.)

*To all whom it may concern:*

Be it known that I, PHILIP BURNS, a citizen of the United States, residing at Norwich, in the county of New London and State of Connecticut, have invented a certain new and useful Improvement in Nut-Locks, which improvement is fully set forth and described in the following specification, reference being had to the accompanying sheet of drawings.

This invention is in the class of devices provided to prevent the accidental unscrewing of nuts, and is particularly valuable for use with bolts used in clamping the meeting ends of tramway-rails.

My object is to provide a lock of simple and cheap construction which ordinarily will serve to prevent the unscrewing of the nut, but which may, when so desired, be adjusted and thrown out of operation to allow the nut to be removed.

In order to explain the said invention clearly, I have provided the annexed drawings, in which—

Figure 1:
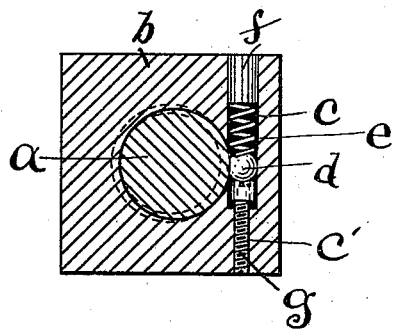
Figure 3:
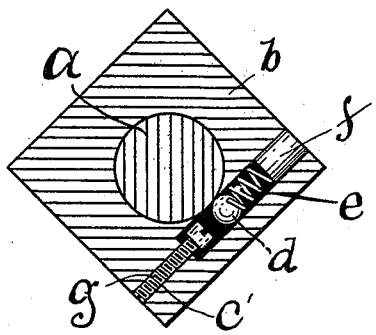
Figure 2:
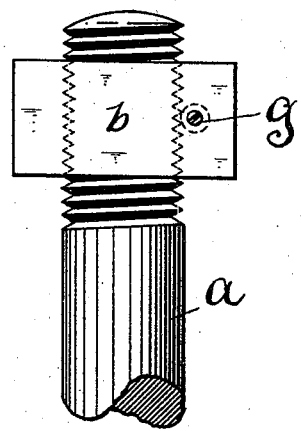
Figure 4:
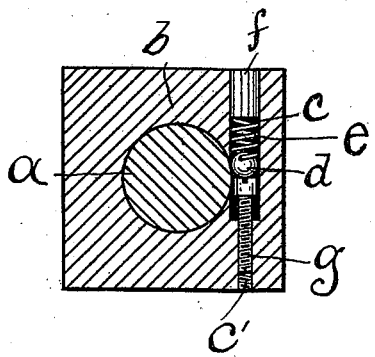

Figures 1, 3, and 4 are cross-sectional views of a bolt and a nut embodying my improvement. Fig. 2 is a side view of said parts.

In the drawings the letter $a$ indicates a bolt, and $b$ a nut screwed thereon. The nut is provided with a hole $c$, extending tangentially to the central opening that receives the bolt and cutting into said hole, as is clearly shown in the drawings. Said hole provides a pocket or chamber in which a hardened ball $d$ is placed. Said ball is of such diameter and the hole $c$ is so located relatively to the bolt $a$ that the threads of the latter extend slightly into the hole and operate to engage and roll the ball back out of the way when the nut is screwed home on the bolt, but when the nut is rotated in the opposite direction to remove it the bolt-threads roll the ball in a direction that jams it between the bolt and the outer wall of the hole $c$, finally wedging the nut against further movement.

To insure the perfect action of the ball, I have preferably provided a spring $e$ in hole $c$, which spring acts with a constant tendency to force the ball into engagement with the bolt-threads, and I close the hole to prevent the escape of the spring and ball by driving into its outer end a plug $f$.

In order that the concealed ball may be controlled and its position relatively to the bolt may be varied to allow the nut to be unscrewed, I extend the hole through to the opposite side of the nut, as at $c'$, said extension, however, being of less diameter than the portion $c$ that holds the ball. The extension $c'$ is then tipped to receive a screw $g$, having a head nearly as large as the diameter of the hole $c$. Said screw is slotted at both ends and is screwed into place in the tapped hole $c'$ by passing it through the larger hole $c$. It will now be seen that when screw $g$ is screwed home, or nearly so, as in Figs. 1 and 3, it forms an abutment to limit the forward movement of the ball and allows the ball to engage the bolt-threads. When, however, it is desired to unscrew the nut, the screw $g$ may be screwed inward, as shown in Fig. 4, by using a screw-driver in the small exposed end of said screw. This will force the ball back in hole $c$, out of reach of the threads of the bolt, and the nut may then be unscrewed freely.

While I have described my lock as especially useful with threaded bolts and nuts, I have demonstrated in practice that it will work equally well to prevent the rotation of an unthreaded rod in a collar or washer.

It will thus be seen that while my desired nut-lock will work automatically under ordinary conditions it may, if desired, be thrown out of operative engagement with the bolt-threads.

Having described my invention, I claim—

In combination with a bolt and nut, a ball supported loosely in said nut in a hole that is tangential to the bolt-hole, as set forth and a screw in said hole forming an abutment for the said ball, for the purpose stated.

PHILIP BURNS.

Witnesses:
FRANK H. ALLEN,
MAY F. RITCHIE.